(12) United States Patent
Terasaki et al.

(10) Patent No.: US 6,343,920 B1
(45) Date of Patent: Feb. 5, 2002

(54) TEMPERATURE CONTROL APPARATUS FOR INJECTION MOLDING MACHINE

(75) Inventors: Mitsuru Terasaki; Wataru Yamanashi, both of Numazu; Yutaka Yamaguchi, Shizuoka-ken, all of (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 09/680,450

(22) Filed: Oct. 6, 2000

(30) Foreign Application Priority Data

Oct. 6, 1999 (JP) .......................................... 11-285676

(51) Int. Cl.$^7$ .............................................. B29C 45/78
(52) U.S. Cl. ........................ 425/143; 264/40.6; 425/144
(58) Field of Search ................................. 425/143, 144; 264/40.6

(56) References Cited

U.S. PATENT DOCUMENTS 3,870,445 A * 3/1975 Hold et al. .................. 425/144
4,480,981 A * 11/1984 Togawa et al. ............. 425/144

* cited by examiner

*Primary Examiner*—Tim Heitbrink
(74) *Attorney, Agent, or Firm*—Pillsbury Winthrop LLP

(57) ABSTRACT

A memory mounted on the same board as a temperature sense module stores a temperature correction value proper to this temperature sense module. On the basis of the temperature correction value read out of the memory, a temperature setting section controls power to a heater, thereby carrying out a temperature control of an injection molding machine.

12 Claims, 2 Drawing Sheets

| SET TEMPERATURE (°C) | MEASURED TEMPERATURE (°C) | TEMPERATURE CORRECTION VALUE (°C) |
|---|---|---|
| 135 | 137 | -2 |
| 140 | 142 | -2 |
| 145 | 148 | -3 |
| 150 | 153 | -3 |
| 155 | 157 | -2 |
| 160 | 163 | -3 |

TEMPERATURE CONTROL APPARATUS FOR INJECTION MOLDING MACHINE

CROSS-REFERENCE TO RELATED APPLICATIONS

This application is based upon and claims the benefit of priority from the prior Japanese Patent Application No. 11-285676, filed Oct. 6, 1999, the entire contents of which are incorporated herein by reference.

BACKGROUND OF THE INVENTION

The present invention relates generally to an injection molding machine, and more particularly to a temperature control apparatus for an injection molding machine, which temperature control apparatus has a temperature management section with a temperature correction function.

In an injection molding machine, an injection molding material is supplied and stored in a molten state, and then the material is injected into a molding die. Thereby, injection molding with a desired shape is carried out. The quality of a product formed by injection molding varies greatly depending on the temperature of the injection molding material. Therefore, the management of temperature of the stored material is very important.

In a conventional injection molding machine, the temperature of the injection molding material is detected by a temperature sensor, and a detection analog output is converted to a digital value by a temperature sense module. The digital value is delivered to a CPU. The CPU prestores, as parameter values, temperature correction values relating to the temperature sense module. The parameters are sent from the CPU to the temperature sense module to correct the output from the temperature sensor. The corrected sensor output is delivered to the CPU, and the temperature control is effected based on a set temperature set by a user.

In general, the temperature sense module is provided on a board different from a board on which the CPU is mounted. In case the temperature sense module has malfunctioned, the board of the module is replaced. However, the parameter values which are equal to temperature correction values are proper to the associated temperature sense module. Thus, in the prior art, if the module board is replaced, the parameter values stored in the CPU-side memory need to be rewritten to confirm to a new temperature sense module. This is time-consuming.

There is another known method in which temperature correction is performed in a temperature sense module by means of circuitry, instead of storing temperature correction values in a CPU-side memory, that is, a temperature correction circuit is built in the temperature sense module. In this method, however, set values in the temperature correction circuits need to be set once again to conform to a new temperature sense module, and this is more time-consuming.

The present invention has been made in consideration of the above circumstances, and its object is to provide a temperature control apparatus for an injection molding machine, which enhances the convenience for users in replacing the board of the temperature sense module.

BRIEF SUMMARY OF THE INVENTION

According to the present invention, there is provided a temperature control apparatus for an injection molding machine, the apparatus comprising: a temperature sensor disposed in a temperature management section of an injection molding machine; a temperature sense module connected to the temperature sensor and outputting a temperature sense signal; and a control section for keeping a temperature of the temperature management section at a set temperature by activating a heater provided in the temperature management section in accordance with a difference between the output from the temperature sense module and the set temperature, wherein the temperature sense module has memory means for storing a temperature correction value proper to the temperature sense module, and the control section includes means for controlling the heater on the basis of the temperature correction value.

With the above structure, a board of an individual temperature sense module is provided with memory means for storing temperature correction values proper to the module. Only by replacing the board, an exact temperature control can be performed, and a temperature control apparatus for an injection molding machine with enhanced convenience can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
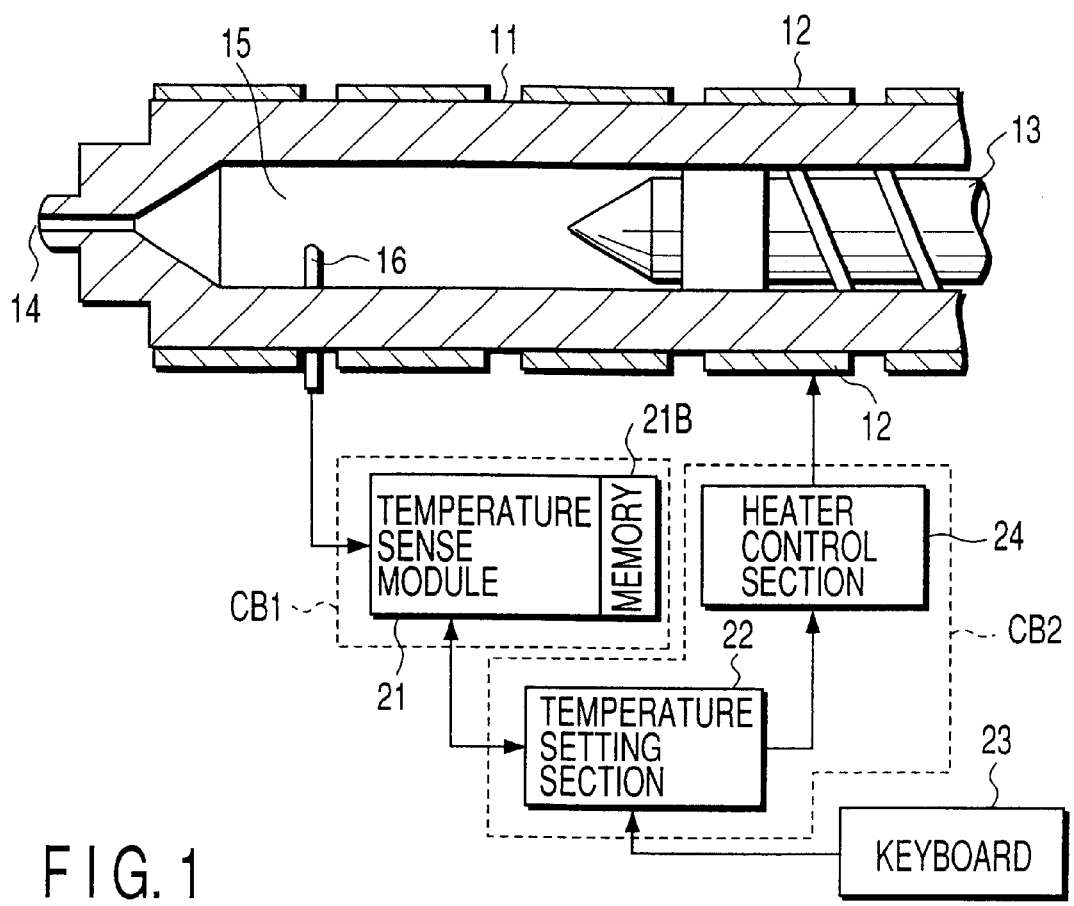
FIG. 1 is a block diagram showing an entire structure of an embodiment of the present invention.

FIG. 1 is a block diagram showing a system structure of an entirely of the embodiment of the invention. Referring to FIG. 1, a heater 12 energized by a heater control section 24 is disposed on an outer periphery of a heating cylinder 11 of an injection molding machine. A screw 13 for feeding an injection molding material under pressure is disposed within the heating cylinder 11.

A material reservoir 15 is defined between the screw 13 and an injection port 14 within the heating cylinder 11. A molten injection molding material is supplied and stored in the material reservoir 15. In order to detect the temperature of the injection molding material, a front end portion of a temperature sensor 16 composed of a thermocouple is projected into the material reservoir 15 from the outside of the heating cylinder 11.

An output terminal of the temperature sensor 16 is connected to a temperature sense module 21 on the outside of the heating cylinder 11. The temperature sense module 21 has an A/D conversion function for converting an analog temperature sense signal from the temperature sensor 16 to a digital signal and delivering the digital signal to a temperature setting section 22 comprising, for example, a microprocessor or a CPU.

Figure 2:
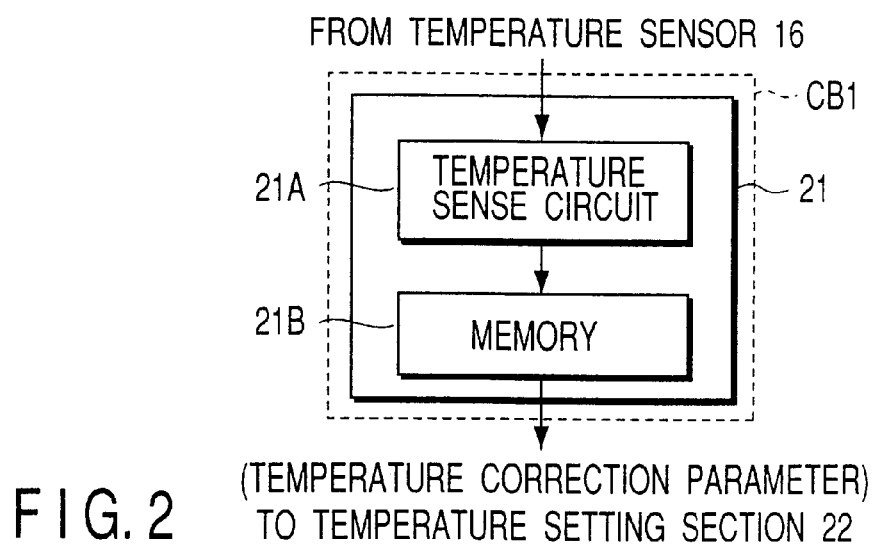
FIG. 2 is a block diagram showing an internal structure of a temperature sense module shown in FIG. 1.

The temperature sense module 21 has a temperature sense circuit 21A, as shown in FIG. 2, which is formed on a circuit board CB1 different from a circuit board CB2 on which the temperature setting section 22 and heater control section 24 are provided. As is shown in FIG. 2, a memory 21B (to be described later in detail) is provided on the circuit board CB1, in addition to the temperature sense circuit 21A. The memory 21B stores a table showing a relationship between set temperatures set by the user and measured temperatures output from the temperature sense module 21. A non-volatile memory such as an EEPROM may be used as The memory 21B.

The temperature sense module 21 has a sense error proper to this module. For example, when the actual temperature of the material reservoir 15 is 130° C. and a sensor error corresponding to this temperature is +3° C., the value of the sensed temperature delivered from the temperature sense module 21 to the temperature setting section 22 is 133° C.

If data indicative of 133° C. is delivered from the temperature sense module 21 to the temperature setting section 22 when the temperature set by the temperature setting section 22 is 130° C., the temperature setting section 22 controls the heater control section 24 to lower the temperature of the material to the set temperature of 130° C. and to reduce the amount of current to the heater 12. As a result, the temperature of the molten material is lowered below the set temperature.

In order to avoid this problem, the memory 21B stores correction data for respective set temperatures, which relates to sense errors proper to the temperature sense module 21.

The data stored in the memory 21B will now be described with reference to FIG. 3. The range of set temperatures for the injection molding material used in the present injection molding machine is 135° C. to 160° C. The temperatures in this range are divided in units of 5° C. and are set in divisions. As is shown in FIG. 3, measured temperatures output from the temperature sense module 21 in association with the respective set temperatures were: 137° C. to set temperature 135° C.; 142° C. to set temperature 140° C.; 148° C. to set temperature 145° C.; 153° C. to set temperature 150° C.; 157° C. to set temperature 155° C.; and 163° C. to set temperature 160° C.

Accordingly, the error correction values to be set in the temperature sense module 21 should be −2° C., −2° C., −3° C., −3° C., −2° C., and −3° C., respectively. Thus, these values are prestored in the memory 21B.

Of course, these values are proper to the temperature sense module 21 provided on the circuit board CB1. Different values apply to another temperature sense module formed on another circuit board, and such different values are stored in a memory provided on such another circuit board.

Figures 3, 4:
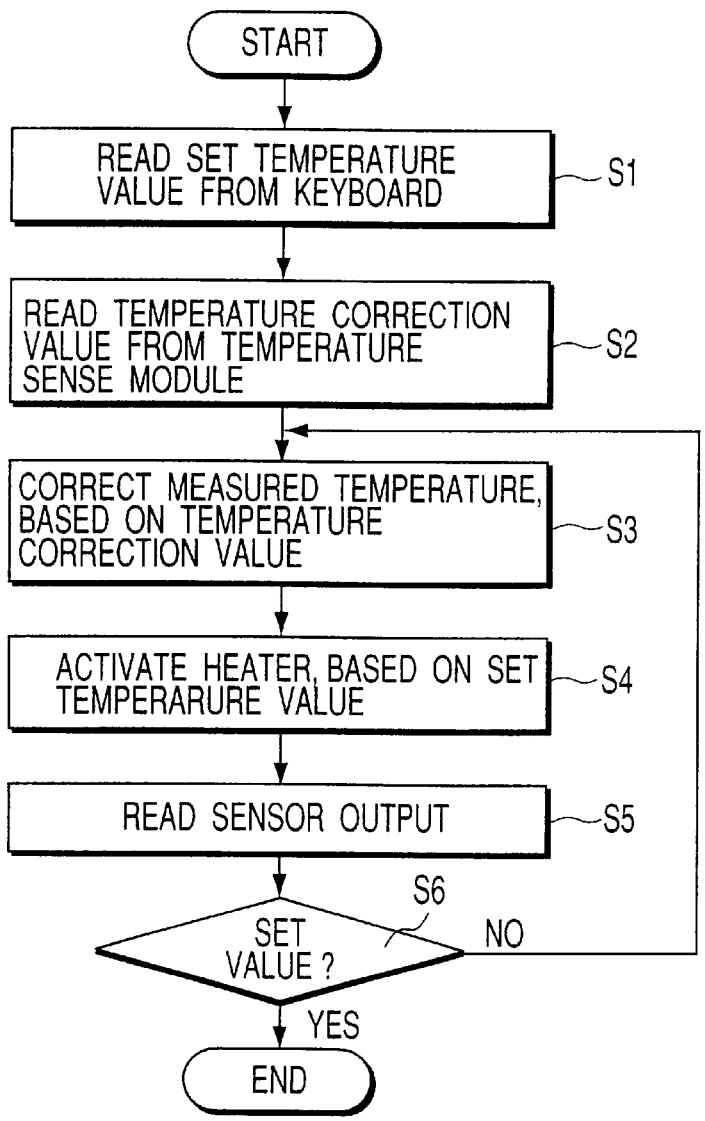
FIG. 3 shows a memory table provided in a memory mounted on the temperature sense module.
FIG. 4 is a flow chart illustrating the operation of the embodiment.

The operation of the embodiment with the above-described structure, as shown in FIGS. 1–3, will now be described with reference to a flow chart of FIG. 4.

Assume that a set temperature of 140° C. has been input by the user through a keyboard 23 in the state in which a molten injection molding material is put in the material reservoir 15 in the heating cylinder 11 shown in FIG. 1.

In step S1, the set temperature data is read from the keyboard 23 into the CPU in the temperature setting section 22.

In step S2, using the set temperature data of 140° C. as address data, a temperature correction value (−2° C.) associated with the set temperature data of 140° C. is read out from the memory 21B in the temperature sense module 21.

In step S3, using the read-out temperature correction value data, a measured temperature value is corrected. In this case, since the set temperature data is 140° C., the temperature of the heater 12 is raised until the measured temperature value reaches 142° C. When the measured temperature value has reached 142° C., it is detected that the set temperature, 142° C. −2° C.=140° C., has been reached using the temperature correction value (−2° C.). Thus, the control to raise the temperature is stopped, and a temperature keeping control is effected in step S4. If the corrected measured temperature value is used in this way, the set temperature is reached exactly and quickly and the temperature keeping control can be carried out.

In step S4, based on the set temperature value (140° C.), the temperature setting section 22 controls the heater control section 24 to supply power to the heater 12. Thus, the temperature of the molten injection molding material is controlled and kept at the target set temperature value of 140° C.

More specifically, in step S5, the temperature of the heated molten injection molding material is detected by the temperature sensor 16 and the detected result is delivered to the temperature setting section 22 via the temperature sense module 21 at predetermined cycles. In step S6, the detected temperature is compared with the set temperature.

If the detected temperature is equal to, or higher than, the set temperature, the power to the heater 12 is stopped or reduced. If the detected temperature is lower than 142° C., control returns to step S3 to repeat the operations of steps S3, S4, S5 and S6.

When a set value of the user is not prestored in the memory 21B, for example, when the user sets the temperature at 143° C. between the set temperatures 140° C. and 145° C. shown in FIG. 3, the CPU assumes that the set temperature is 145° C. to which 143° C. is closer than to 140° C. and executes the process. Accordingly, the temperature control is carried out using the temperature correction value (−3° C.) associated with the set temperature of 145° C. in the table of FIG. 3.

In the above-described embodiment, as shown in FIG. 3, the temperature correction values are stored in association with the respective set temperatures. However, an average of these temperature correction values may be found and the average value may be used as a common parameter value for the temperature sense module 21. Alternatively, since the temperature correction value is −2° C. or −3° C., either of them may be representatively used as a parameter value.

In the above-described embodiment, the temperature control is carried out for the heating cylinder of the injection molding machine. However, needless to say, this invention is applicable to other parts of the injection molding machine, which require a temperature setting control.

As has been described above in detail, according to the present invention, a memory storing temperature correction value data proper to an associated temperature sense module is mounted on a board of the temperature sense module. Therefore, this invention provides a temperature control apparatus for an injection molding machine, which can always perform a simple, exact temperature control, with enhanced convenience for users, even if the temperature sense module is replaced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A temperature control apparatus for an injection molding machine, the apparatus comprising:
  a temperature sensor disposed in a temperature management section of an injection molding machine;
  a temperature sense module connected to the temperature sensor and outputting a temperature sense signal; and
  a control section for keeping a temperature of the temperature management section at a set temperature by activating a heater provided in the temperature management section in accordance with a difference between the output from the temperature sense module and the set temperature,
    wherein the temperature sense module has memory means for storing a temperature correction value proper to the temperature sense module, and
    the control section includes means for controlling the heater on the basis of the temperature correction value.

2. A temperature control apparatus for an injection molding machine according to claim 1, wherein the memory means is a non-volatile memory.

3. A temperature control apparatus for an injection molding machine according to claim 1, wherein the temperature correction value is an average of errors between actual temperatures and a plurality of said set temperatures.

4. A temperature control apparatus for an injection molding machine according to claim 3, wherein the memory means is a non-volatile memory.

5. A temperature control apparatus for an injection molding machine according to claim 1, wherein the temperature sense module is formed on a first circuit board, and the control means is not formed on the first circuit board.

6. A temperature control apparatus for an injection molding machine according to claim 1, wherein the memory means stores a table denoting a relationship between the set temperature, a measured temperature and the temperature correction value.

7. An injection molding machine comprising:
  a heating cylinder receiving a molten injection molding material and injecting the molten injection material;
  a heater disposed on the heating cylinder;
  a temperature sensor for detecting a temperature of the molten injection molding material;
  a temperature sense module connected to the temperature sensor and outputting a temperature sense signal; and
  a control section for keeping a temperature of the heating cylinder at a set temperature by activating the heater in accordance with a difference between the output from the temperature sense module and a set temperature,
    wherein the temperature sense module has memory means for storing a temperature correction value proper to the temperature sense module, and
    the control section includes means for controlling the heater on the basis of the temperature correction value.

8. An injection molding machine according to claim 7, wherein the memory means is a non-volatile memory.

9. An injection molding machine according to claim 7, wherein the temperature correction value is an average of errors between actual temperatures and a plurality of set temperatures.

10. An injection molding machine according to claim 9, wherein the memory means is a non-volatile memory.

11. An injection molding machine according to claim 7, wherein the temperature sense module is formed on a first circuit board, and the control means is not formed on the first circuit board.

12. An injection molding machine according to claim 7, wherein the memory means stores a table showing a relationship between the set temperature, a measured temperature and the temperature correction value.

* * * * *